Jan. 19, 1965   C. J. CHAPLIN   3,166,191
MOLDED PULP PACKAGE
Original Filed Nov. 19, 1957   2 Sheets-Sheet 1
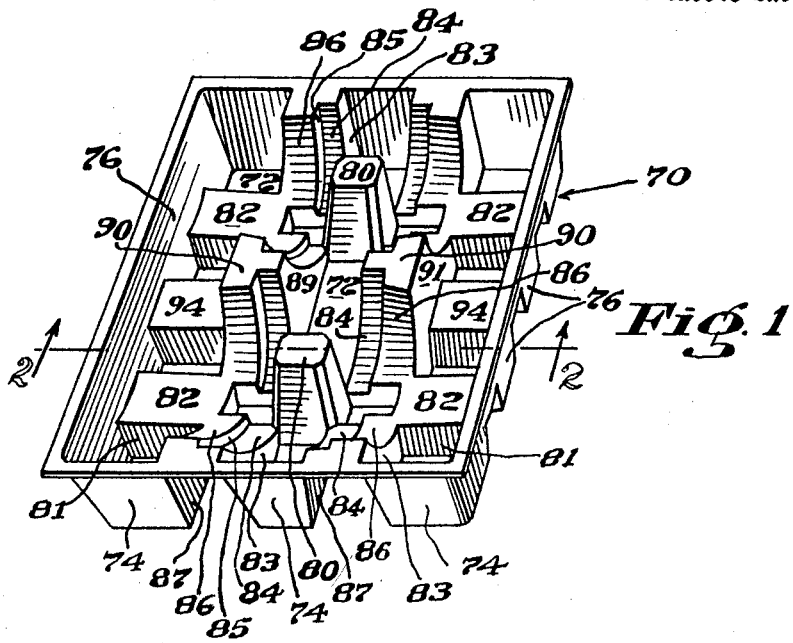
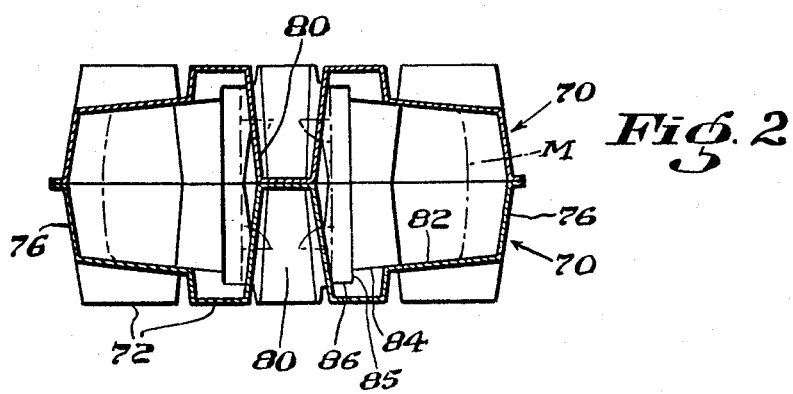
INVENTOR
Charles J. Chaplin
BY Karl W. Flocks
ATTORNEY Jan. 19, 1965   C. J. CHAPLIN   3,166,191
MOLDED PULP PACKAGE
Original Filed Nov. 19, 1957   2 Sheets-Sheet 2
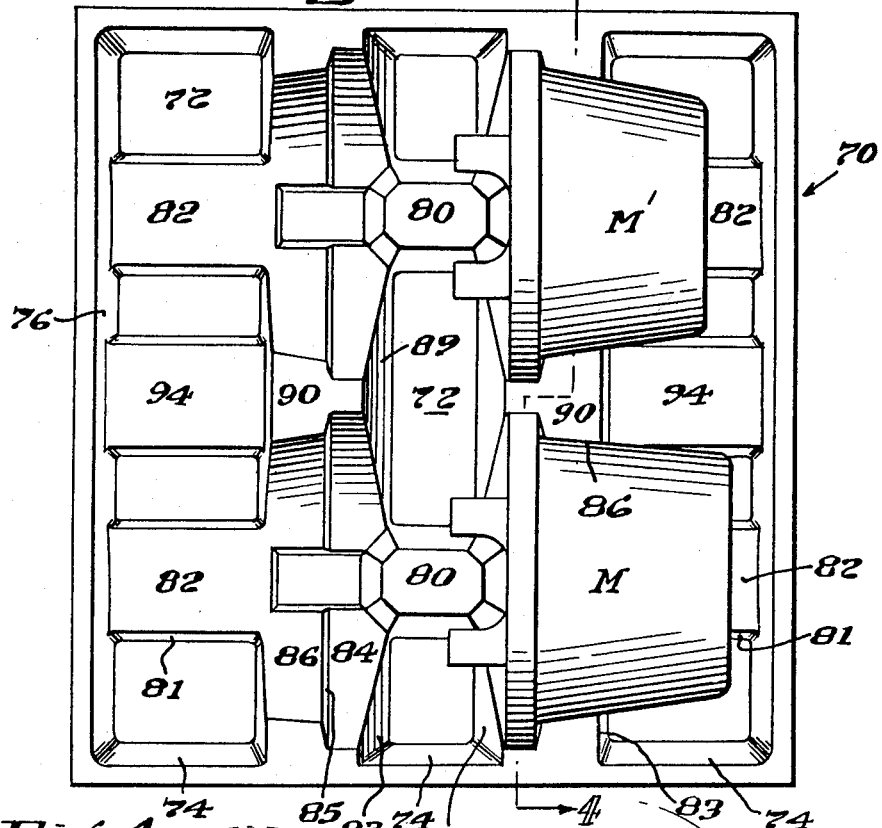
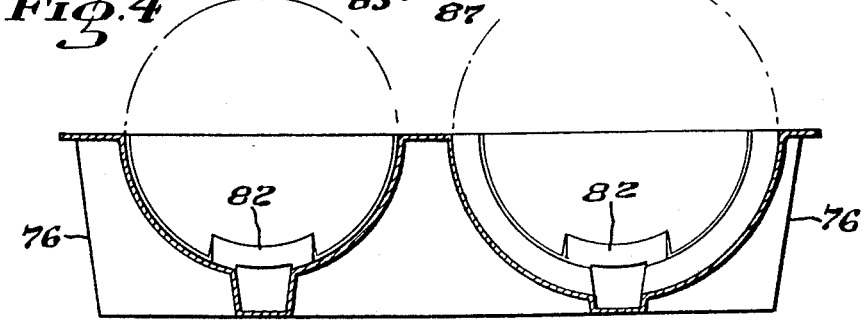
INVENTOR
Charles J Chaplin
BY Karl W. Flocks
ATTORNEY 3,166,191
MOLDED PULP PACKAGE
Charles J. Chaplin, Portland, Maine, assignor to Diamond National Corporation, New York, N.Y., a corporation of Delaware
Application July 11, 1961, Ser. No. 130,448, which is a division of application Ser. No. 759,111, Aug. 22, 1958, now Patent No. 3,016,177, dated Jan. 9, 1962, which is a division of application Ser. No. 697,369, Nov. 19, 1957. Divided and this application Dec. 10, 1963, Ser. No. 336,090
2 Claims. (Cl. 206—65)

This invention relates to packaging, and more particularly to a novel molded package providing an enclosure having a plurality of integral sections or members for suspending an article therein out of contact with the walls of the enclosure. This application is a division of my copending application Serial No. 130,448 which is a division of application Serial No. 759,111 (which issued as United States Letters Patent No. 3,016,177 on January 9, 1962) which is a division of abandoned application Serial No. 697,369, filed November 19, 1957.

The provision of economical packaging for relatively fragile articles, or articles where handling shocks must be minimized, has long been a problem in the packaging art. There are three essential requirements.

(1) A sturdy, strong product which will stand rough handling and damage on any portion of its exterior, (2) A yielding, suspension area or members for supporting the object on the inside of the rigid package, and (3) Low cost.

Another objective of molded packaging is to provide a package which is complete in itself. In other words, which does not require being placed in a fibreboard and/or other package for shipment. Such an article, in order to provide adequate support and protection for the packed product must resist deformation either by vertical pressure when being placed at the bottom of a stack of similar or other articles, or by puncturing or breaking during rough handling. In all instances, whether it be handling or storage, no appreciable force, weight or strain should be applied to the packed suspended product, the outer case, walls, or structure of the pack absorbing all of the shock and/or other loads.

According to the present invention, a novel package is provided wherein a fragile article is supported over a relatively large surface area and out of contact with the walls thereof beyond the reach of expected damage and in a manner such that shock loads or forces transmitted to the article are reduced to a value which the particular article is capable of resisting. Briefly, this is accomplished by the use of a molded package having relatively rigid outer walls providing a surrounding enclosure and a plurality of substantially energy-absorbing supporting structures molded integrally with and usually projecting inwardly from said walls to support an article in a position spaced from said walls. In accordance with the principles of the present invention, the internal support structures are progressively deformable under shock loads, thereby reducing the "$g$" factor, or shock factor, on the article while the outer walls of the enclosure maintain their original position, stiffness and rigidity.

It is known that the shock loads or forces which any article can resist without damage can be expressed for a particular article in terms of a multiple of the force of gravity, the factor "$g$," applied in a given direction relatively to the article. Therefore, each different type or kind of article must have its molded pack engineered to meet the particular requirements. First, that adequate protection be given to the weight, size and stacking requirements of the complete package, and, second, that sufficient shock absorbing means be provided to reduce the "$g$" factor under shock loads below that which is the maximum which the article or product will absorb in itself without damage.

Considering for a moment a perfectly rigid support for a fragile article, so long as the "$g$" forces applied to the support are less than the minimum value of "$g$" force which can be applied to the article without damage, such a support will provide the best possible support for a fragile article, since, if accurately fitting, it can hold the article firmly and positively prevent any movement of the article relative to its supporting structure which itself might cause "$g$" forces large enough to damage the article. An elastic support, on the other hand, has the advantage of not requiring the accurate fitting of a rigid support, and will cushion the article supported thereby and so generally reduce the smaller "$g$" forces applied to the package. In the event of the application of a high "$g$" force, however, an elastic support must inevitably itself create large "$g$" forces, particularly when bottoming occurs, that is, collision at the limit of travel of the elastic support.

The support of the present invention, however, frequently prevents article damage when "$g$" forces greater than those the article is capable of resisting are applied to the package, by virtue of the energy absorbing qualities of its non-resilient molded pulp supporting structure, which unique qualities neither rigid nor elastic structures can provide. The suspended article, then, so long as the package is not subjected to a shock load or force greater than that at which the article supports are intended to fail progressively, is rigidly supported within the package. This prevents creation of shock loads on the article by movement of the article itself within the package which might result in shock loads high enough to damage the article even though the initiating shock load applied to the walls of the package be less than the critical value, as might occur upon collision of the article with a non-yielding surface within the package. However, when the package receives a shock load of a predetermined value somewhat less than that which the suspended article is designed to resist, progressive deformation of the supporting structure begins so that the excess shock load is absorbed thereby without being transmitted to the article.

It is an object of the present invention to provide a molded pulp package having an internal normally rigid supporting structure especially useful for odd shaped articles without the necessity for accurate dimensioning of the package or its support. This has been accomplished by providing a rigid, generally non-resilient, hollow, energy absorbing supporting member with an article contacting surface of readily deformable material so that it will deform to the extent necessary to fit itself to an article positioned within the package and yet rigidly support it thereafter.

It is yet another object of the invention to provide a molded pulp package having a supporting structure with a limited degree of resiliency to enable the resilient support of an article therein if desired, this being accomplished by the use of a resilient surface on the otherwise non-resilient supporting structure so that the energy absorbing qualities upon progressive deformation thereof are not seriously affected.

Various other objects and features of the invention will be apparent from the following description of preferred embodiments thereof, together with the accompanying drawings wherein:

FIG. 1 is an isometric view of one symmetrical half of a modified form of a package according to the present invention and intended to carry a plurality of articles; and FIGS. 3-4 are views of the package half of FIG. 1, FIGS. 2 and 4 being sections taken on the lines 2—2 to 4—4 thereof, and FIGS. 3 and 4 showing the package with articles enclosed therein.

In FIGS. 1-4 is shown a novel package according to the present invention, made up of two identical molded pulp package halves, of generally uniform wall thickness throughout, but especially adapted for enclosing and suspending conventional watt hour meters having a glass cup-like forward portion and an enlarged cylindrical rear portion usually with four terminals protruding therefrom spaced from the vertical center line of the circular rear face of the instrument. Such meters are relatively fragile, particularly in regard to the bearings of their rotating elements, and must be protected against high "g" loads which are likely to occur during shipment. Furthermore, since motor packages are generally stacked for storage and shipment, it is important that the weight of the motors in the upper layers of a stack not be imposed upon the meters in the lower layers, but rather be taken by the walls of the packages themselves.

A package capable of enclosing and suspending four individual watt hour meters is shown in FIGS. 1-4. Such package also has the advantage of being able to handle meters having cup-like glass portions of differing overall lengths presently common in the industry. This is accomplished in the structure of FIGS. 1-4 by supporting the meters against movement in a forward direction parallel to their axes at their rim portions, enabling the omission of a supporting projection in contact with the front face of the glass cup-like portion of the meter. Thus, as shown in FIGS. 1-4, the four meter half package 70 has a bottom 72, side walls 74, and end walls 76 as well as a plurality of projections positioned at the juncture of the bottom and the walls which serve independently to support the meters spaced from one another and the side walls. In addition, further projections are provided which extend upwardly from bottom 72. Thus, as shown best in FIG. 3, a generally straight sided upstanding projection 80 is positioned midway between end walls 76 generally along the common center line of each of the pairs of meters arranged in back-to-back relationship with said projection 80 maintaining them including their terminals out of contact with one another. Further projections, one adjacent each of walls 76 and 77 along said common centerline, are also provided for supporting away from the bottom the glass cup-like end of the meters and such projections, by virtue of their spaced panels 81 extending perpendicularly to end walls 76 and bottom 72 and their meter supporting panel 82 extending therebetween, also serve to stiffen the package.

For supporting the cylindrical rim of the meter, stepped arcuate surfaces are provided on each side of said centerline for each of said pairs of meters with the arcuate surfaces 84 of greater radius adjacent projection 80 and with the arcuate surfaces of lesser radius 86 spaced from surfaces 84 by a radially extending wall 85 which is adapted to retain the forward face of the rim portion of a meter. The surfaces adjacent the side walls 74 of the half package are in the form of projections at the juncture of said side walls and bottom and have spaced stiffening panels 83 and 87 adjacent surface 84 and 86 respectively. The arcuate surfaces adjacent the center of the package take the form of a pair of upstanding projections 90, each supporting at one side thereof on said arcuate surfaces 84 and 86 a pair of meters in side-by-side relationship adequately spaced from one another, with such projections 90 having inner opposed stiffening panels 89 spaced from one another and projecting upwardly from bottom 72 to the edge of arcuate surfaces 84 and outer stiffening panels 91 similarly projecting upwardly to the edge of arcuate surfaces 86. Preferably, a stiffening projection 94 of inverted U shape extends upwardly from bottom 72 between each of outer stiffening panels 90 and end walls 76.

In use, as best shown in FIG. 3, four meters may be supported within a pair of package halves 70, and meters having cup-like glass portions of different lengths may be accommodated. For example, in FIG. 3 the package half of the invention is shown as supporting two meters M and M' of different length, the meters in each case being restrained against movement in a direction toward an end wall 76 by virtue of contact of the forward face of their rim-like portions with surface 85, thus keeping the forward face of their cup-like glass portions spaced from end wall 76 at all times.

By sealing together opposed peripheral flanges of the package halves 70 by any suitable adhesive, the meters will be protected against dust, moisture and damage.

As set forth in the discussion of the principles of the present invention, the wall thickness of the panels and surfaces contacting the meters are controlled as desired to provide a strength so that progressive deformation of the article suspending structure will begin to deform at "g" forces somewhat less than those which will damage the article being protected.

Thus, assuming that the maximum tolerable "g" force which can be applied to the article is known, a wall strength can be arrived whereby the energy absorbing progressive failure of the article support structure will commence at a somewhat lower value than the maximum tolerable "g" force, and this can be readily ascertained by calculation or test whichever is most appropriate. The test can be carried out by means of a mass equivalent to the article and through the use of a suitable accelerometer which will record "g" forces in conventional drop tests or the like. The wall test of the supporting structure will be dependent upon a number of factors which can be readily controlled in accordance with conventional pulp molding procedures. Thus, wall thickness will affect wall strength, as well as the specific nature of the pulp fiber deposited on a forming die. Wall thickness in particular is easily controllable by varying deposit times so that series of packages having different wall strengths may quickly and easily be made up for testing to arrive at the wall strength desired for a particular package application.

Thus, it will be seen that the invention provides both novel molded articles and die structures especially useful in the protective packaging of fragile articles. Various modifications of the invention not herein disclosed but within the spirit of the invention and the scope of the appended claims will be apparent to those skilled in this art.

I claim:

1. A molded pulp package comprising, in combination, four watt-hour meters and a pair of separate, identical package halves, each said package half including a bottom integral with side and end walls, a plurality of projections integrally formed at the juncture of said bottom and side and end walls independently supporting the meters in spaced relation with respect to each other and said walls, additional projections extending from said bottom centrally between end walls on a generally common center line, pairs of said meters being arranged in back-to-back relationship with said further projections maintaining said meters out of contact with one another, additional projections adjacent each of said end walls generally along said common center line engaging said meters and supporting the same in spaced relation from said bottom, said projections at the intersections of said bottom, side and end walls including stepped arcuate surfaces engaging opposite sides of said meters, said stepped arcuate surfaces comprising one surface of greater radius than an adjacent surface for engaging conforming portions of said meters.

2. The structure of claim 1 wherein said projections and surfaces engaging said meters are progressively deformable when a predetermined load force is exceeded, thereby cushioning the packaged meters.

References Cited in the file of this patent
UNITED STATES PATENTS

| | | |
|---|---|---|
| 1,850,584 | Gray | Mar. 22, 1932 |
| 2,560,847 | Chaplin | July 17, 1951 |
| 2,863,595 | Emery | Dec. 9, 1958 |